United States Patent [19]
Symanski

[11] Patent Number: 5,004,655
[45] Date of Patent: Apr. 2, 1991

[54] THIN BIPOLAR LEAD-ACID BATTERY WITH INDIVIDUAL CELL VENT

[75] Inventor: James S. Symanski, Grafton, Wis.

[73] Assignee: Globe-Union Inc., Milwaukee, Wis.

[21] Appl. No.: 450,550

[22] Filed: Dec. 14, 1989

[51] Int. Cl.⁵ .................... H01M 2/12; H01M 2/14
[52] U.S. Cl. .................................. 429/82; 429/139; 429/185; 429/210
[58] Field of Search .................. 429/53, 54, 82, 130, 429/131, 138, 139, 185, 210

[56] References Cited

U.S. PATENT DOCUMENTS

| | | | |
|---|---|---|---|
| 3,421,944 | 1/1969 | Bauer | 429/130 X |
| 3,784,414 | 1/1974 | Macaulay et al. | |
| 3,964,932 | 6/1976 | Oltman et al. | |
| 3,997,365 | 12/1976 | Feldhake | 429/185 |
| 4,275,130 | 6/1981 | Rippel et al. | 429/144 |
| 4,659,636 | 4/1987 | Suzuki | 429/54 |
| 4,664,994 | 5/1987 | Koike et al. | 429/163 |

Primary Examiner—Anthony Skapars
Attorney, Agent, or Firm—Foley & Lardner

[57] ABSTRACT

A thin, bipolar, lead-acid battery includes one or more cells, each of which is provided with a one-way vent for allowing release of gas generated during battery formation or overcharge. A planar spacer, having a cut out central portion, receives the electrode and separator components, and has one or more passageways formed therein extending from the wall of the cut out portion to the exterior of one of its edges. The spacer then resembles a frame for the battery components. Film sheets are applied to the opposed surfaces of the spacer and extend outwardly therefrom, at least in the vicinity of the spacer hole. The film is sealed, e.g. by heat, in all exterior areas except adjacent the hole. An oil, such as a silicone oil, is used between the film sheet in the non sealed area to form a one way "duck bill" type vent valve.

17 Claims, 3 Drawing Sheets

THIN BIPOLAR LEAD-ACID BATTERY WITH INDIVIDUAL CELL VENT

BACKGROUND OF THE INVENTION

1. Field of the Invention

The present invention relates generally to the field of lead-acid storage batteries and more particularly to thin, bipolar lead-acid batteries. Still more specifically, the invention relates to the assembly of such a battery in a manner which permits venting of gases evolved during formation and overcharge and, simultaneously, provides a means for introduction of electrolyte to the battery cells.

2. Background Art

Bipolar batteries are known to the art and consist generally of a positive plate, a negative plate and a separator, with substrates employed if multiple cells are used, to permit electron flow through the substrate. It has been attempted to combine several of the flat cells into multicompartment batteries encased in a suitable container.

In Koike, et al, U.S. Pat. No. 4,664,994 issued May 12, 1987 for "Enclosed Lead Storage Battery And Process For Producing The Same", a plastic film enclosure is provided around an entire cell by heat sealing a plastic film around the edges. Special provisions are made for sealing the film to the collector tabs. A safety valve is provided in the Koike, et al system by not sealing a certain area of the plastic film, whereby gas escape from within the cell is permitted, while oxygen or moisture introduction into the cell is prevented by the film to film contact in the area of the safety valve. A multiple cell structure showing the same type of individual cell wrapping, with collection of current occurring through contacts between tabs is shown in Suzuki U.S. Pat. No. 4,659,636 issued Apr. 21, 1987 for "Sealed Storage Battery".

Certain primary flat plate batteries having multiple layers and peripheral seals are shown in U.S. Pat. No. 3,784,414 issued Jan. 8, 1974 to Macaulay, et al for "Battery Sealant Carrier Having Adhesive Patches Impregnated Therein And A Method For Making It", U.S. Pat. No. 3,964,932 issued to Oltman, et al on June 22, 1976 for "Battery Having Deformations In A Metal Layer"; U.S. Pat. No. 3,997,365 issued Dec. 14, 1976 to Feldhake for 'Battery Having Polyamide Hot Melt Adhesive Seal'. These latter patents do not describe any type of valve for permitting gas release, or for that matter, any charging technique which would lead to gas evolution. See also U.S. Pat. No. 4,275,130 issued June 23, 1981 to Rippel, et al for "Bipolar Battery Construction". The construction proposed does not use a venting arrangement as described herein.

It is desirable to provide multicell, bipolar batteries which are compact, which are rechargable and which are safe from the standpoint of having a gas release safety valve. As the design of such lead-acid, bipolar cell units approaches smaller and smaller dimensions, it will become increasingly difficult to provide an effective safety valve in the thin cells. It would represent a substantial improvement to this art if cell vent safety valves could be provided in a dimensionally effective and reliable manner.

SUMMARY OF THE INVENTION

The present invention provides a unique arrangement of components for a bipolar, lead-acid battery having a safety valve and a desirable construction for minimizing cell pack size.

The present invention further provides a unique spacer having a vent hole communicating with a safety valve, the spacer being adapted to receive battery components and being adjustable to reliably control interplate spacing and cell dimensions.

The present invention also provides a spacer and film spacer cover, an external portion of which is sealed and another portion of which is not sealed, to form a one-way valve for preventing entry of moisture or oxygen while permitting the escape of gas during charging or formation.

The present invention further envisions the use of an adhesive to bond the film to the spacer and an oil to assist in sealing the valve portion of the film.

The present invention additionally envisions a thermoplastic spacer employed with a thermoplastic film to avoid the need for a separate adhesive.

The present invention additionally provides the capability for a wide variety of battery designs having from one to a plurality of bipolar cells.

The present invention is able to provide the forgoing enhancements, and others which have not been specifically set forth, by providing a unique design of a spacer. In the preferred embodiment, the spacer comprises a frame member which is generally rectangular and which has a thickness which most preferably is sufficient to accommodate a negative electrode plate, a separator and a positive electrode plate of the type known to the art to be useful for the formation of bipolar batteries. The frame member has a rectangular cut out portion to receive the aforementioned battery components. The frame, of uniform thickness, includes at least one passageway, bored from the inside portion of the cut out to the exterior of the frame, thus permitting the free passage of gas or fluid. Two film sheets are placed over the faces of the frame and are adhered to the faces, using adhesives or heat as will be described below. The film is removed from the cut out portion, but in the preferred embodiment extends outwardly from the exterior of the spacer, where the sheets are adhered to one another around the periphery of the spacer, except in the overlap area adjoining the hole in the spacer. At that location the film is left unsealed but in abutting film-film engagement, into which an oil is placed to form a "duck bill" type one-way escape valve. The battery is preferably assembled by placing the active materials for the electrodes on substrates in such a way that adhesion of the substrates to the outer faces of the film covering the spacer, with a separator located therebetween will result in a thin, bipolar configuration having desirable size and safety characteristics. The preferred embodiment will be described in detail below, but the invention is not to be limited thereby. The invention will be set forth in the claims which follow the description of the preferred embodiment, and the structures and methods recited therein, and their equivalents as anticipated in light of the specification, will define the invention.

DESCRIPTION OF THE DRAWINGS

In the FIGURES, like reference numerals are used to indicate like components. Dimensions in the drawings are not to scale so that the components of the invention, and their arrangement and method of attachment, may be better understood.

DETAILED DESCRIPTION OF THE PREFERRED EMBODIMENT

Figure 1:
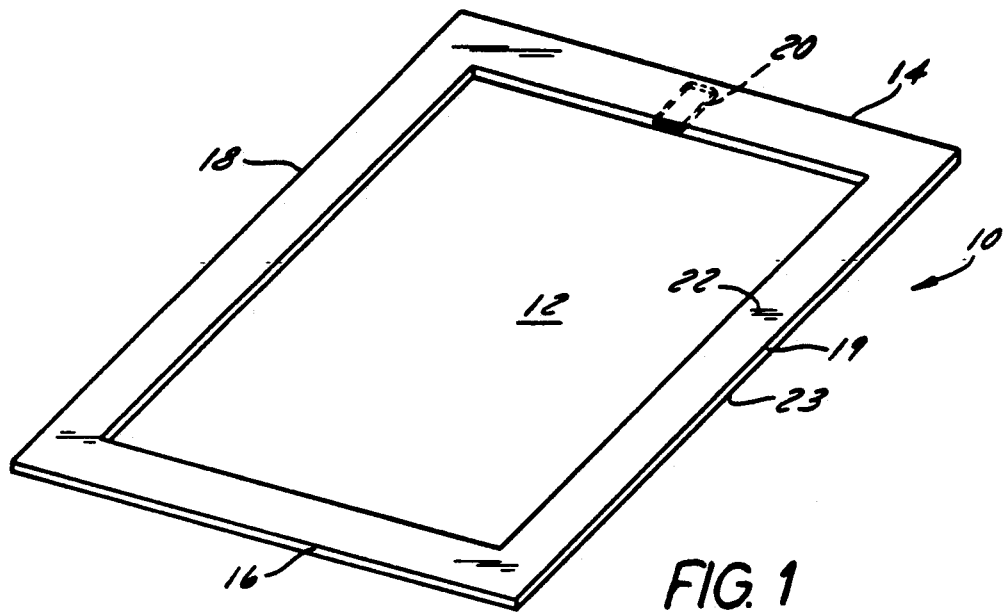
FIG. 1 is a perspective view of the spacer used in the present invention to form a cell vent, showing in dotted line a vent hole therethrough.

Referring initially to FIG. 1, a spacer element 10 used in the present invention is shown in perspective fashion. Spacer 10 is a generally planar, generally rectangular sheet having a rectangular opening 12 cut from the center thereof. Spacer 10 is then defined by top border 14, bottom border 16 and side borders 18 and 19. The dimensions of spacer 10, opening 12 and the shape (e.g. square vs. rectangular) will depend on the size and shape of the final battery and can be varied widely.

A single vent passageway 20 is provided at the center of top border 14 extending entirely through it so that fluid or gas could pass freely through passageway 20. More than one passageway could be provided, and the location of the single or multiple passageways 20 is not critical, with respect to their distance from the upper portion of the side borders 18 and 19. The thickness of spacer 10 will also be highly dependent upon the overall design of the final battery, but in the most preferred embodiment, the thickness is approximately the thickness of a positive electrode plus a negative electrode plus a separator sheet, as will become more fully apparent from the description below.

Figure 2:
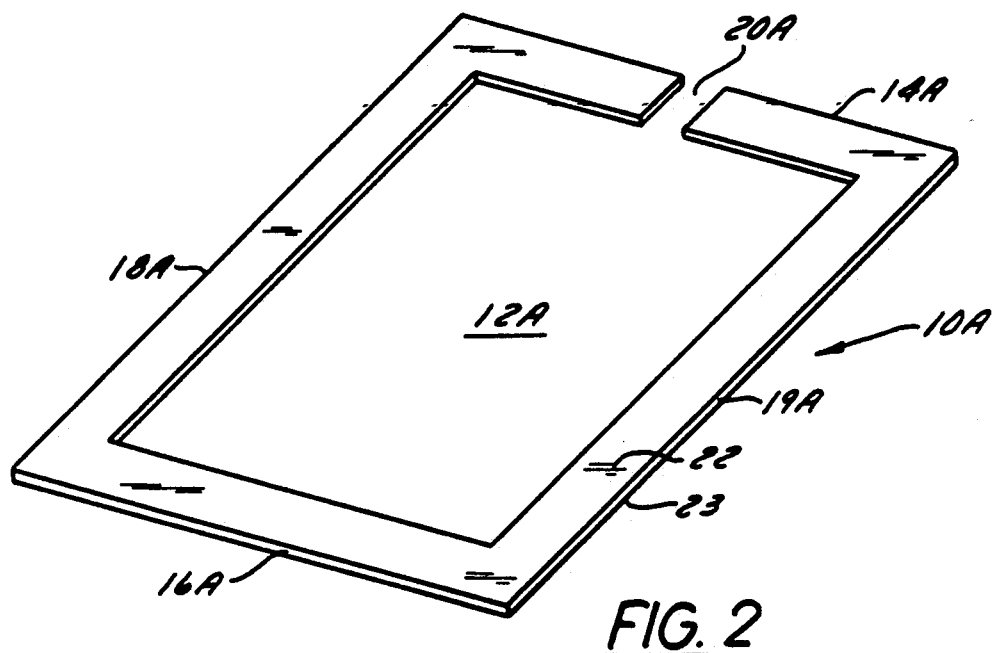
FIG. 2 is a perspective view of an alternative embodiment of the spacer used in the present invention to form a cell vent.

Alternate configurations of spacer 10 may be employed. For example, with reference to FIG. 2, spacer 10A is depicted having a generally planar configuration, with rectangular opening 12A cut from the center thereof. Spacer 10A is defined by side borders 18A and 19A, bottom border 16A and broken top border 14A. Passageway 20A is thus provided at the center of top border 14A and extends entirely through it. In contradistinction to passageway 20 of spacer 10, passageway 20A is cut out from top border 14A such that there is no border left in top border 14A around the passageway. In applications where the thickness of the space is decreased, i.e. less than 0.050 inches, the configuration of spacer 10A may be preferred.

Spacer 10 is constructed, for example, from a plastic material such as Lexan ® polycarbonate. This particular material is transparent, but transparency is not required. More importantly, the material must be electrically non-conductive and be resistant to the electrolyte (e.g. a sulfuric acid solution) which will be employed in the battery. The front and back faces 22 and 23 of spacer 10 will serve as contact and adhesive surfaces, so the material selected must have good properties for adherence of the adhesives as well. The above-referenced polycarbonate meets all of these requirements. Other materials suitable for preparing spacer 10 include other thermoplastic resins, including polyolefins, such as polyethylene or polypropylene. Finally, significant rigidity is preferred for dimensional stability.

Figure 3:
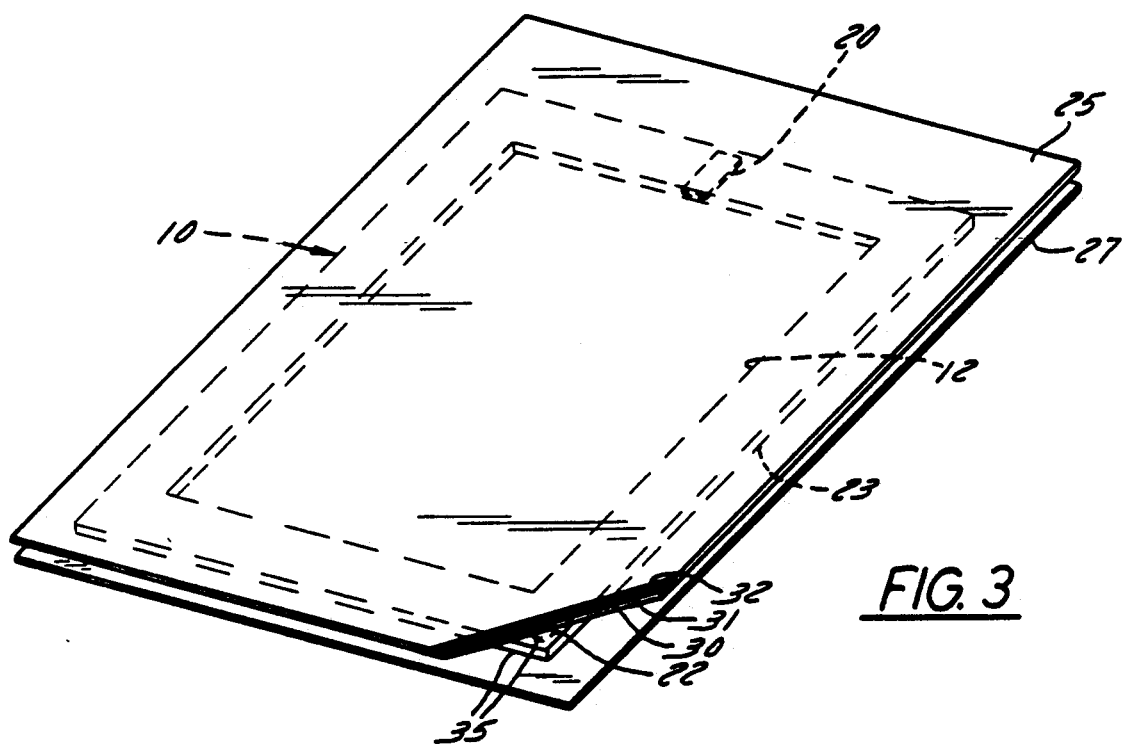
FIG. 3 is a perspective view of the spacer of FIG. 1 showing applied sheeting of polymeric film and showing in exaggerated form on one corner the layers comprising a sheet.

Referring next to FIG. 3, spacer 10 is shown sandwiched between two flexible plastic sheets 25 and 27 of film, sheets 25 and 27 extending over opening 12 and beyond the four borders of spacer 10. While not shown in this perspective view (but see FIG. 5), sheets 25 and 27 are adhered to faces 22 and 23 of spacer 10 using a suitable adhesive or by heat sealing.

The film may be selected from a large variety of resins, so long as the film provides certain necessary properties. These include resistance to the electrolyte, good adhesion with the adhesive used to affix the film to spacer 10, impermeability to oxygen and moisture, thermoplastic properties for heat sealing (see below) and maintenance of these properties over the temperature range to which the battery will be exposed. I have found that a film laminate, which is commercially available from Ludlow Corp. of Mt. Vernon, Ohio, is ideal for this application. The film consists of three layers (shown schematically at one corner of FIG. 3), each of which provides important properties. The inner layer 30 (inner refers to the layer adjoining faces 22 and 23) is a polypropylene layer which has good adhesive and heat sealing properties. An intermediate polyvinylidene chloride layer (Saran HB ®) 31 provides a high degree of oxygen and moisture barrier properties, and the outer layer 32 consists of a polyethylene terephthalate layer for strength, as well as for good adhesion.

Other materials which could be used for the inner layer 30 include polyethylene (of various densities), other polyolefin copolymers (such as vinyl acetate or acrylic acid copolymers) and terpolymers. Graft copolymers may also be used. The barrier layer 31 chould be prepared from laminating such materials as polyvinyl alcohol, polyacrylonitrile or polyvinyl chloride. The lamination techniques for forming film sheets such as 25 and 27 are, in and of themselves, well known and do not form part of the present invention. One skilled in the resin art could readily select still further resin layer combinations after reading the present specification and its teachings of the properties required for sheets 25 and 27.

An adhesive 35 is preferably employed to bond sheets 25 and 27 onto spacer 10, and again this material must be oxygen and moisture impermeable, acid resistant, and have good adhesion to the sheets and the spacer. An acrylic adhesive is preferred, such as Fastape A adhesive distributed by Tekra Corporation of New Berlin, Wisc. This material is a polyester film coated on both sides with a high shear acrylic. The carrier is approximately .5 mil and the coating is 2 mil on each side. From FIG. 3 it is apparent that the adhesive is used only on the front and back faces 22 and 23 of the four border edges, leaving the remainder of sheets 25 and 27 unattached to any component. Adhesives without carrier films may be employed in the present invention, and numerous alternatives are available to meet the property requirements set forth above.

Figure 4:
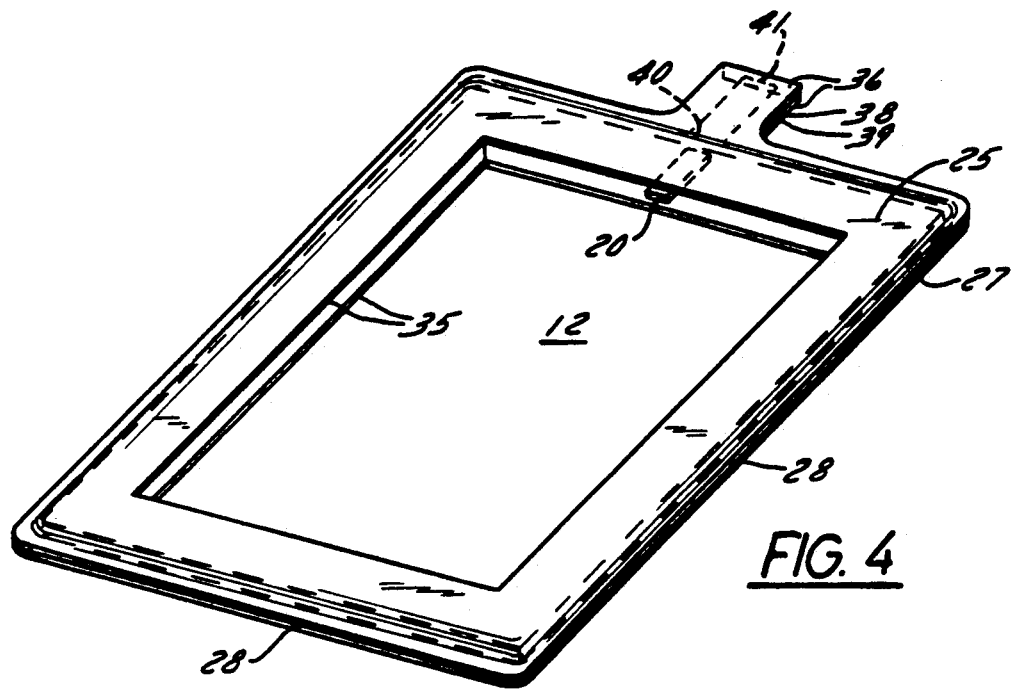
FIG. 4 is a perspective view of the spacer shown in FIG. 1 showing the film sheets removed from the open portions of the spacing and sealed around the periphery thereof except at the area adjacent the spacer vent hole.

Referring next to FIG. 4, it will be noted that the central portions of sheets 25 and 27 which covered center cut out 12 have been removed, which removal can be accomplished by cutting the material away or burning it away using a hot wire. Other techniques known in the plastic film handling art may be employed to accomplish this step, e.g. die cutting. It will also be noted that the inner sides of sheets 25 and 27 have been sealed to one another at a location 28 just outwardly of the bottom and side edge borders of spacer 10, a small amount of the sheets being left to reduce the strain on the heat weld and cut which may be made using conventional film burn/cutting techniques.

At the top of spacer 10 the film sheets are also welded together adjacent to the border 14, except at the portion thereof adjacent passageway 20. In this area a pair of tabs 36 are formed in film sheets 25 and 27 which extend outwardly, e.g. for approximately 0.5 to 1 inch (the length and width being primarily a function of the size and/or capacity of the cell and the venting pressure limits desired for a particular application). The sides 38 and 39 of the tabs are heat sealed to one another (again using conventional techniques), leaving an opening 40 extending from top border 14, through the length of tabs 36 and exiting tabs 36 at 41.

It is, however, necessary that passageway 40 prevent the entry of air or moisture into passageway 20 and this is accomplished in the preferred embodiment by utilizing an oil between the layers of film sheet, to form a one way escape valve. Dimethyl silicone oils are suitable for this purpose, although other oils impermeable to oxygen flow and being chemically resistant may also be employed.

It should be apparent from the description of these FIGURES that it is not necessary to cover, extend and heat seal the film layers 25 and 27 on and around the three border sides 16, 18 and 19, if the sheets are sealed to the face 14. Neither is it necessary to have such an overlap and heat seal all along edge 14, but if one is not provided, it will be necessary in some manner to seal the opening that will exist between the film sheets adjacent the tabs which will soon be described. An adhesive filler, for example, could be used.

Now that FIGS. 1-4 have been described, it will be evident that a plastic spacer having film bonded to the faces thereof, preferably sealed along the periphery and with a one way vent has been prepared. Its incorporation into a thin, bipolar, lead-acid battery will now be described by reference to FIG. 5. It should be appreciated, however, that the dimensions of the sections have been selected for ease of illustration, especially the layers of adhesives.

Figure 5:
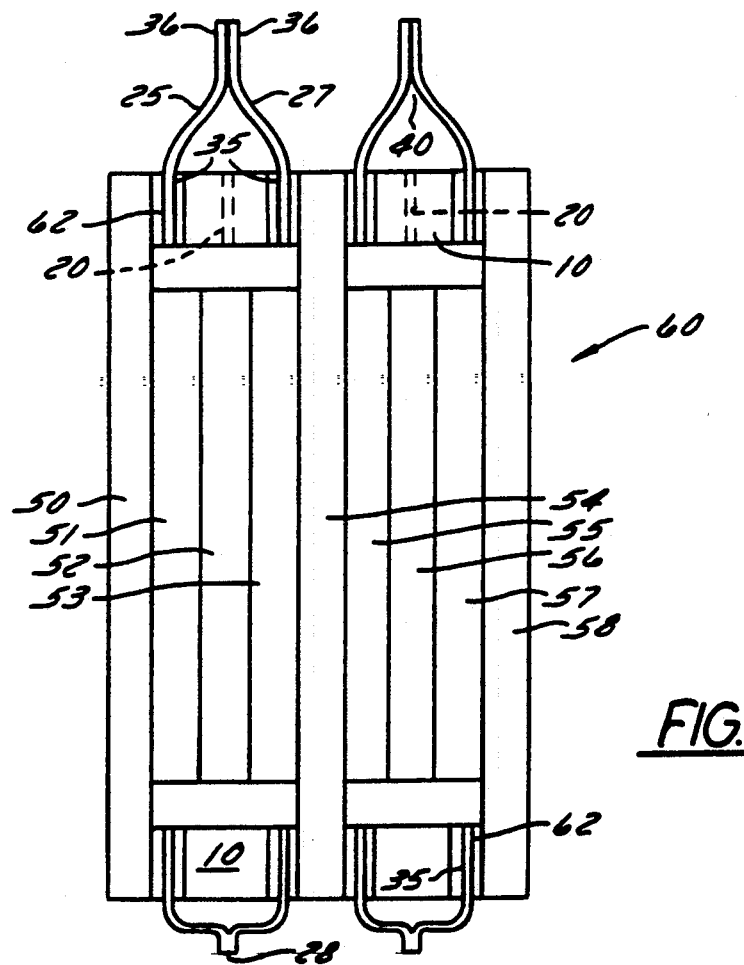
FIG. 5 is a sectional view illustrating the construction of a battery, of the bipolar, lead-acid variety, and having two cells for purposes of illustration.

Before proceeding to describe FIG. 5 it must be noted that while materials commonly employed in the storage battery art are used in the preferred embodiment, their presentation is for purposes of illustration, not limitation. Various substrate, plate and separator configurations could be substituted by one skilled in this technology.

FIG. 5 shows in sectional view, various components providing a two cell battery 60. One cell or more than two cells can be employed. It is only important that each cell has a one way gas escape valve using the spacer device described above. At the left side of FIG. 5 is a first substrate 50, which is a sheet material of the type used as substrates in bipolar lead-acid batteries. A thin lead sheet is employed in the preferred embodiment. Affixed to substrate 50 is a negative electrode 51 containing, for example, sponge lead active material, followed by a separator 52, a positive electrode 53 containing, for example, porous lead dioxide active material and another substrate 54. This sequence is followed in the right hand cell starting with substrate 54, negative electrode 55, separator 56, positive electrode 57 and a final substrate 58. The bipolar nature of the battery 60 is reflected at the cell junction where positive and negative electrodes 53 and 55 flank substrate 54. Substrates 50 and 58 may be the same or different from substrate 54.

To construct battery 60, the active electrical materials are preferably applied to their respective substrates (single or double sided, typically on grids as is well known). It then becomes necessary to adhere the substrates to the film layers 25 and 27 on spacers 10. Preferably the electrodes are manufactured so that the area thereof is similar to but slightly smaller than the area of cut out portion 12, while the substrate has dimensions substantially the same as spacers 10. The separators 52 and 56 (glass fiber mats, for example) are placed under compression between the electrodes during assembly. The substrates are then adhered to the film layers 25 and 27, for example with Fastape A adhesive 62. The adhesive could be different than the other adhesive layers 35. Additionally, adhesive 62 must be able to bond a metal (lead sheets 50, 54 and 58) to a plastic film layer, e.g. 25. The electrical couplings needed for completion of the external battery circuit are not shown in FIG. 5, but they will be selected based on the desired rate of current drain. Such couplings are, in and of themselves, known to the bipolar battery art.

In addition to providing the necessary venting of gas produced during battery formation or overcharge, the combination of passageways 40 and 20 are suitable to allow for the introduction of electrolyte into the cells. Such introduction in thin cells can be accomplished by injection using a thin needle.

While the present invention has been described by reference to a single preferred embodiment, it is not to be limited thereby, but is to be limited solely by the claims which follow.

What is claimed is:

1. A battery cell including a vent for permitting the escape of gases from said cell and for preventing the entry of moisture or oxygen into said cell, said cell comprising:
   a spacer comprising a rigid member having generally planar surfaces and a cut out portion whereby a frame is formed, at least one passageway extending through said member;
   film sheeting covering both of said surfaces of said member and extending beyond the periphery thereof;
   means for adhering said sheeting to said member; and
   means for joining said film sheeting to each other except at the extending area adjoining said passageway.

2. The battery cell of claim 1 wherein said spacer is made from a non-conductive plastic material.

3. The battery cell of claim 1 wherein said film sheeting is a film laminate which provides a thermoplastic layer adjacent said surfaces and an outer layer which acts as a barrier to penetration of oxygen or moisture.

4. The battery cell of claim 1 wherein said means for adhering comprises a high sheer acrylic adhesive.

5. The battery cell of claim 1 wherein said means for joining said sheeting comprises providing a thermoplastic layer on the facing surfaces of said sheeting and heating said sheeting while in contact to form a heat weld therebetween.

6. The battery cell of claim 1 wherein a silicone oil is placed between said sheeting in the extending portion thereof adjoining said passageway.

7. The battery cell of claim 1 wherein said spacer has generally opposed, parallel surfaces and said cut out portion is generally parallel to and spaced between said surfaces.

8. The battery cell of claim 3 wherein said laminate comprises an inner polyolefin layer, an intermediate barrier layer including polyvinylidene chloride, and an outer layer including polyethylene terephthalate.

9. The battery cell of claim 4 wherein said means for adhering comprises a tape coated on each side with a high sheer acrylic adhesive.

10. The battery cell of claim 1 further comprising positive electrode means, a separator means and negative electrode means secured generally within said cut out portion of said spacer.

11. The battery cell of claim 9 further comprising substrate means on opposed ends of said cell, one substrate supporting said positive electrode and one substrate supporting said negative electrode and means for attaching said substrates to the outer surfaces of said sheeting.

12. The battery cell of claim 10 wherein said means for attaching comprises a high sheer acrylic adhesive.

13. A bipolar battery which includes a vent for allowing escape of formation and recharging gases and which includes positive and negative active electrode materials supported on substrates, the improvement comprising a spacer plate having a cut-out portion adapted to receive said electrode materials, a passageway extending outwardly from said cut-out portion through said plate to the exterior thereof, film means attached to opposing faces of said plate in the vicinity of said passageway and extending outwardly therefrom for being formed into a one-way gas vent, means for sealing the portion of said film means extending outwardly of said plate to form said gas vent so that gas is prevented from entering or leaving said passageway except through said vent.

14. The battery of claim 13 wherein said spacer plate is made from a non-conductive plastic material.

15. The battery of claim 13 wherein said passageway comprises a plurality of passageways.

16. The battery of claim 13 wherein said film means comprises a film laminate.

17. The battery of claim 13 wherein said film means comprises two sheets of film which extend beyond the periphery of said spacer plate and are heat sealed to one another except at the area of said gas vent.

* * * * *